United States Patent [19]

Johnson et al.

[11] 4,149,784
[45] Apr. 17, 1979

[54] ROLL FILM READER/PRINTER WITH MANUALLY INSERTABLE DISCRETE FILM

[75] Inventors: Delmar R. Johnson, Barrington; Thomas R. Wells, Des Plaines, both of Ill.

[73] Assignee: Bell & Howell Company, Chicago, Ill.

[21] Appl. No.: 759,157

[22] Filed: Jan. 13, 1977

[51] Int. Cl.² ............................................. G03B 21/00
[52] U.S. Cl. ................................. 353/23; 353/26 R; 353/95; 353/121
[58] Field of Search ................ 353/68, 120, 121, 122, 353/26, 27, 25, 95, 22, 23

[56] References Cited
U.S. PATENT DOCUMENTS

| | | | |
|---|---|---|---|
| 1,552,604 | 9/1925 | Hoberdier et al. | 353/35 |
| 1,698,013 | 1/1929 | De Zeng | 353/35 |
| 2,231,765 | 2/1941 | Landrock | 353/26 R |
| 2,236,371 | 3/1941 | Kennedy | 353/23 |
| 3,183,771 | 5/1965 | Rutkus | 353/26 R |
| 3,604,793 | 9/1971 | Wangerin et al. | 353/26 A |
| 3,708,677 | 1/1973 | Volk et al. | 353/26 A |
| 4,006,980 | 2/1977 | Wells | 353/26 R |

Primary Examiner—Harry N. Haroian
Attorney, Agent, or Firm—Harry G. Thibault; Alan B. Samlan

[57] ABSTRACT

A roll film reader/printer transports film to a selected photographic area. Transparent areas are also left at any one or more selected locations on the roll film. When it is necessary or desirable to read an image on a separate and discrete film, "card", the roll of film is transported through the reader/printer in order to display a transparent area. There, the separate and discrete film "card" is manually inserted into the reader/printer, over the transparent area on the roll film. Suitable interlock switches disable the roll film transport mechanism while the manually inserted film is in the reader/printer.

6 Claims, 6 Drawing Figures

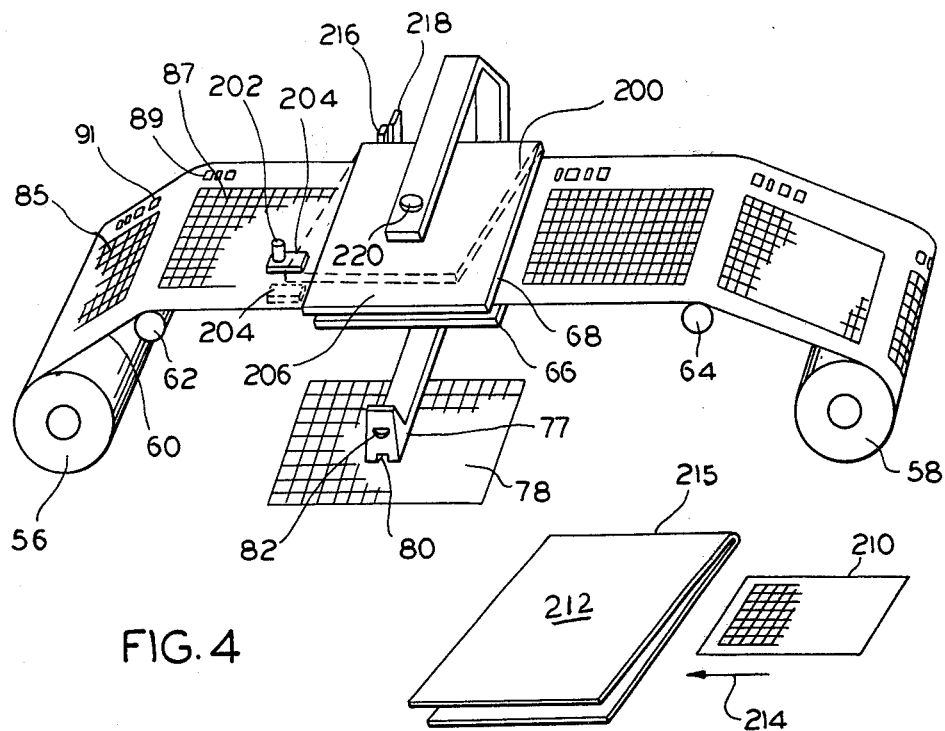
FIG. 4
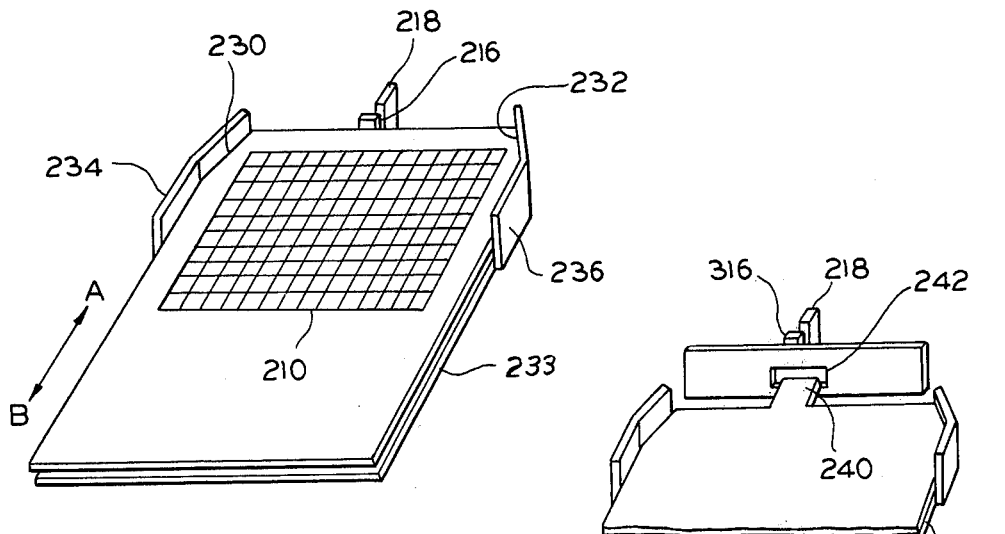
FIG. 5
FIG. 6

ROLL FILM READER/PRINTER WITH MANUALLY INSERTABLE DISCRETE FILM

Reference is made to two copending applications: entitled "Microprocessor Controlled Roll Film Microfiche Reader", Ser. No. 711,180, filed on Aug. 3, 1976, by Delmar Johnson, John R. Flnt, Thomas Wells, Rolf Erikson and Bruce Rady, and "Microfilm Reader Printer", Ser. No. 741,929, filed Nov. 15, 1976, by Robert Flint and Bruce Rady, both of which are assigned to the assignee of this invention.

This invention relates to roll film reader/printers and more particularly to such reader/printers having manual insert capabilities, whereby specific images may be read from a separate and discrete "card" of film, without having to remove the roll film from the reader/printer.

The invention finds utility anytime that it is necessary or desirable to transport strips of film (especially microfilm). Therefore, the term "reader/printer" is to be construed broadly enough to cover readers, printers, or reader/printers, and all equivalent devices, both combined and separated. Likewise, the term "film" is to be construed broadly enough to cover any medium which may be transported and used in the inventive manner.

A microfiche is a well known photographic device wherein a plurality of images are micro-photocopies arranged in an orthogonal array, on small and individual cards or sheets of film. Therefore, the cards may become lost, damaged, destroyed, or filed out of order. Sometimes a large library of microfiche may contain information which must be updated, as the recorded information becomes obsolete or is superseded. If this information must be updated on a continuous basis, a substantial amount of time and labor is required, and filing mistakes are often made. Moreover, there are costs in copying and manipulating the individual cards or sheets of film, which costs are not incurred when copying or manipulating rolls of film. Therefore, the above-identified copending applications disclose a structure for using roll film having imagery recorded thereon, especially in the microfiche format.

However, there are also times when it may be necessary or desirable to read an individual microfiche. Accordingly, it would be time consuming and bothersome if it should be necessary to unload the roll film in order to display an individual microfiche. It would be an expensive waste of space and resources if two reader/printers are used, one for roll film and one for discrete microfiche.

Accordingly, an object of the invention is to provide new and improved microfilm reader/printers, which may display either roll film or discrete film cards. Here, an object is to provide reader/printers which do not require an unloading of roll film in order to read an individual micro-photographic card.

Another object is to provide reader/printers wherein information is printed on a roll of microfilm in the distinctive photographic format of a microfiche. In this connection, an object is to enable the information to be displayed in exactly the same manner without regard to whether it is printed on either a roll of film or a discrete microfiche.

Yet another object of the invention is to enable a ready call-up and display of large catalogs of information on compact rolls of microfilm, while also enabling individual and discrete microfiche to be read.

In keeping with an aspect of the invention, these and other objects may be accomplished by a roll film reader/printer wherein transparent areas are left on the film at any one or more selected locations. When it is necessary or desirable to read a separate and discrete film card, the roll of film is transported to display a transparent area. There, the separate and discrete film card is manually inserted into the reader/printer, over the transparent area. Suitable interlock switches are provided to disable the roll film transport mechanism while the manually inserted film is in the reader/printer.

The nature of a preferred embodiment of the invention may be understood best from a study of the attached drawing wherein:

FIG. 4 is schematic representation (in perspective) of the film transport portion of a microfilm reader/printer;

FIG. 5 is a perspective drawing of a first alternative embodiment of the manual film carrier; and FIG. 6 is a perspective showing of a second alternative embodiment of the manual film carrier.

Figure 1:
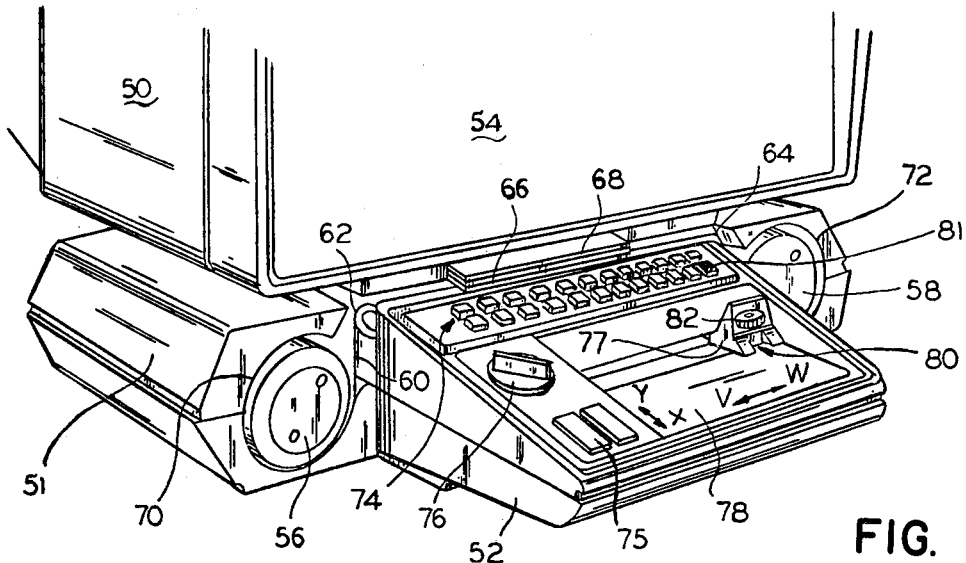
FIG. 1 is a perspective view of a roll microfilm reader, printer, or reader/printer, incorporating the principles of the invention.
Figure 2:
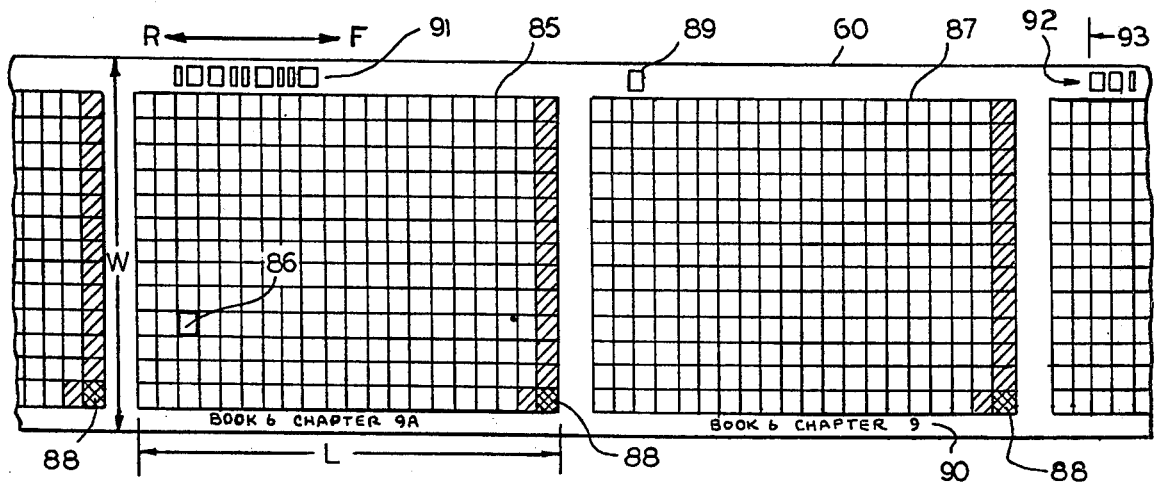
FIG. 2 is a schematic layout of a web or strip of roll film, having a plurality of photographic areas, each in a microfiche format with special bar codes printed along an edge of the film, each code being located near the photographic area which it identifies.
Figure 3:
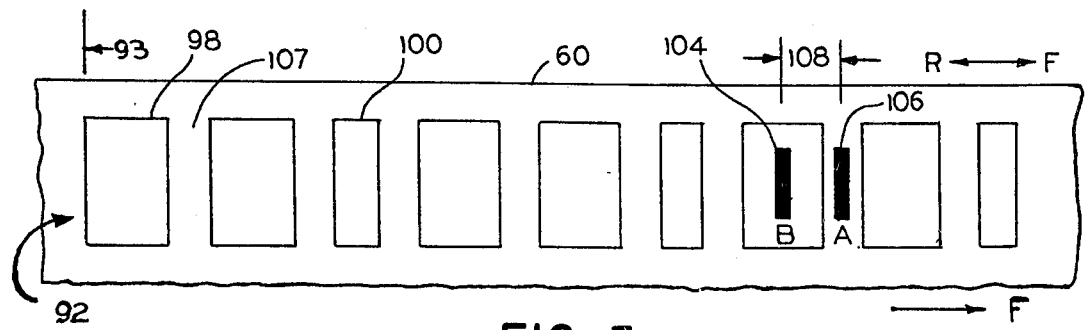
FIG. 3 shows an exemplary bar code of the type which is used to identify each photographic area on the roll.

FIGS. 1-3, herein, are the same as FIGS. 1-3 in each of the two above-identified copending applications. The full and complete nature of a roll film transport mechanism is disclosed in these co-pending patent applications, along with the control circuits thereof. Therefore, the following description of these figures will be brief.

The reader, printer, or reader/printer (FIG. 1) comprises a hood 50, a film transport mechanism 51, and a control panel 52. The hood 50 includes a rear illuminated screen 54, in front of a cavity which is large enough to sustain a beam of light that contains the projected microfilm image.

The transport mechanism includes a supply (relative to forward film transport) roll or reel 56, a take up roll or reel 58 and a web or length of film 60 extending therebetween. Any suitable number of guide rollers may also be provided (as shown at 62, 64). Between these guide rollers, the film passes a viewing position which is located between two flat, glass plates 66, 68 (usually called "glass flats") which are closely spaced to clamp and hold the film while the image is being projected.

The control panel 52 includes a photographic area address selector in the form of a plurality of push bottons 74 and a rotary switch 76. The rotary switch may be turned to select an address code of a book and the push buttons may be operated to select an address code of a chapter in that book.

Once the photographic area representing the selected book and chapter has been automatically delivered to a viewing position, it remains stationary. The operator grasps a handle 77 and moves it over an index printed on plate 78. This handle is connected to and movable with a yoke carrying lens 220 (FIG. 4) and a light source. When handle 77 reaches a selected point on the index plate 78, a corresponding page or image on a photographic area of film 60 is projected onto the reader/printer screen 54. A thumb wheel 82 on handle 77 may be turned to focus the image projected onto the screen 54.

FIG. 2 shows a small section of film 60 which illustrates how the photographic areas are arranged thereon and identified by bar code addresses. In greater detail, each photographic area (85, for example) may have any convenient length "L" and a width "W" approximately equal to the width of the film. The images of each of the photographic areas are arranged in any convenient format, such as the orthogonal layout of a microfiche, for example. The drawing has been marked at 90, by way of example, to indicate that the images on photographic area 87 are identified by the address "Book 6, Chapter 9", which is also indicated by the bar code 92 address.

A series of bar code addresses (such as 89, 91, 92) is printed along one margin of the film and precisely located at the same positions relative to each individually associated photographic area. Therefore, if the bar code 92, for example, is precisely positioned by the film transport mechanism so that a sensor is at one edge, such as 93, of the code 92, the photographic area 87 is precisely located in the viewing area or in the optical path of the reader/printer.

It is totally irrelevant whether the film travels from left to right or from right to left. Neither direction is preferred. However, it is convenient to have an expression for distinguishing between these two directions. Therefore, one direction is arbitrarily called "forward" and the other "reverse". This same arbitrary terminology is used to identify "forward" and "reverse" motors which are individually associated with the reels 56, 58, to drive the film in those respective directions.

When the film 60 passes between glass flats 66, 68, the upper flat 68 may be opened to the position shown by dotted lines 200 while the film 60 is being transported or closed to the position shown by solid lines while the film is stopped and being read. In order to control the glass flat position a solenoid 202 (FIG. 4) is positioned immediately above the glass flat 66 while it is in the open position 200. An armature 204 of magnetic material is cemented, or otherwise attached to the upper glass flat 68. When the solenoid 202 is energized, armature 204 is attracted to raie the glass flat 68. When the solenoid 202 is deenergized, the armature 204 is released, and the glass flat 68 falls under the force of gravity. Before the film is transported, the glass flats are opened, and they remain open until after the transport comes to a complete stop. When the film stops with an image between the glass flats, they close automatically.

FIG. 4 also includes other separate parts of FIGS. 1-3 which are pertinent to the present invention. The relationship between the various drawings may be understood best by comprising the reference numerals which identify the same parts in all drawings.

When the film 60 is originally printed, blank spaces are left, perhaps both by design and by change. For example, it might be decided to leave a blank space on the film, at the end of each chapter. Another plan might be to leave blank spaces at random primarily to allow room for growth of data stored on the film. In any event, care is taken to be certain that there is at least one blank space, free of photographic images, at some place on the film, and preferably there is always a blank space at the end of the film. If a blank space is left after eeach chapter (or the equivalent), the transport mechanism will not have to travel too far before it finds a blank space. If the blank space is only at either or both ends of the film, the transport might have to wind the entire roll before it finds a blank. Also, the reader/printer should be arranged, so that it never allows the leader section at either end of the film to enter the space between the glass flats. Therefore, if all else fails, the leader should stop the transport.

If it is necessary or desirable to read a discrete microfiche, a special one of the keys 74 is operated to cause the transport to position a completely blank section of film within the glass flats, as shown at 206. The film transport may be operated to select this blank film position in any of three different ways. First, each blank area may be identified by a special bar code which corresponds to a specially marked push button in the keyboard 74. Thus, to manually read a discrete microfiche, it is only necessary to push the specially marked push button.

A second way to reach the blank film is for the person, who is operating the control switches 74, 76 to request a non-existing code. In greater detail, the control circuit for the transport mechanism is designed to automatically go to the bar marking of a blank film when a selected code cannot be found. More particuarly, the film transport control circuit first causes the film to be reeled in one direction in search for a desired code. If the code is not found, the film is reeled too far and the control circuit finds that it must command the film transport to reverse direction. If the transport again goes too far, it will again reverse the film travel direction. There will be three reversals in the direction of film travel, and then the control circuit will conclude that there is no such code and switch its code setting to become the address of a blank film. For example, one of the positions of rotary switch 76 might identify data which is not on the film supplied to a particular user.

A third way to reach blank film 206 is for one of the bar codes to become smudged, obliterated, or otherwise unreadable. The code reader does not respond when the unreadable code appears; therefore, the control circuit concludes that the unreadable code does not exist and it automatically resets itself to look for the code which identifies the blank film.

A discrete microfiche 210 is inserted in a microfiche carrier 212, of any suitable design. As here shown, the microfiche carrier 212 is preferably a single fold sheet of clear and transparent plastic. As indicated by the arrow 214, the discrete, microfiche 210 may be fitted between the upper and lower layers of the plastic and against or near the bight of the end fold 215.

The control circuit for the reader/printer is arranged to continuously energize the solenoid 202 if the transport stops with a blank section of film between the glass flats. Therefore, the glass flat 68 remains open, and in the position shown by dashed lines 200. The microfiche carrier 212 is inserted over the blank film 206 and between the raised glass flat 68 and the lower stationary glass flat 66. When the microfiche carrier 212 is inserted far enough to reach the back of the glass flats, it pushes against an actuator lever 216 and operates "Microswitch" 218. Responsive thereto, the solenoid 202 is de-energized, to enable an operation of the reader/printer. Glass flat 68 falls under the force of gravity, to clamp both the blank film and the microfilm carrier in the plane between the glass flats 66, 68.

Then the handle 77 is manipulated to position the lens 220 over a selected image in the area, in the same manner that it scans over the image area (such as 85) printed on the roll film 60. The light passing upwardly through lens 220 travels through the blank film 206, both sides of carrier 212, and the microfiche 210. However, except for the microfiche image, all of these layers are transparent. Therefore, there is little or no noticeable effect in the projected image as a result of the added layers of film, as compared to the normal background caused by projection through the transparent parts of the film 60.

After the image of the discrete microfiche 210 has been read, the carrier 212 is pulled slightly. The actuator lever 216 and, therefore, the "Microswitch" 218 are released. The solenoid 202 is energized, because the film is still standing on the blank film bar code where the control circuit normally holds the glass flat 68 in the open position 200.

FIG. 5 shows a further refinement which may sometimes be desirable, although it is not normally required. Here, the two leading corners 230, 232 of carrier 233 are cut at an angle. Mating guide ways 234, 236 are formed in the reader/printer, also with tapered leading corners. Therefore, when the carrier 233 is inserted between the glass flats, the guides 234, 236 cause it to come into a specific position relative to the location of the glass flats. This helps to position the discrete microfiche in carrier 233 in a better viewing position.

FIG. 6 shows still another refinement which may sometimes be necessary or desirable. Here, the carrier 237 has an extension 240 which must fit through a slot 242 behind the glass flats in order to push the actuator 316 and operate the "Microswitch" 218. This way, it is not easily possible to operate the reader/printer by inserting foreign objects between the glass flats. Thus, the invention provides an interlock which tends to require use of a predetermined carrier.

If a greater degree of security is required, a more complex keying system may be provided; therefore, if there are any particular security problems, the extension 240 may be encoded to form a key which has to be matched to similarly encoded slots at 242. Such encoding is here symbolically represented by the fact that the slot 242 and extension 240 are off center.

Those who are skilled in the art will readily preceive how the disclosed structure may be modified. Therefore, the appended claims are to be construed to cover all equivalents falling within the true scope and spirit of the invention.

I claim:

1. A roll film reader/printer comprising means for transporting a roll of film to display a selected image area within a predetermined viewing position, said roll of film comprising at least one blank and transparent section which is subtantially free of any photographic images and is large enough to cover at least a substantial portion of the viewing position, and glass flat means which are opened while said transport means is operating and closed while said transport means are stopped, and a manual insertion mode having means for holding said glass flat means open when said transport means stops at said blank section and for enabling a manual insertion of a discrete piece of film over said blank section and means responsive to said insertion of said discrete film over said blank section for closing said glass flat means, whereby any image on said discrete film may be read without removal of said roll film from said reader/printer.

2. The reader/printer of claim 1 and film carrier means shaped and proportioned to be inserted between said glass flat means, whereby said discrete film may be positioned in said film carrier means when it is inserted over said blank section.

3. The reader/printer of claim 2 and means for guiding said film carrier means into said viewing position.

4. The reader/printer of claim 3 and means for interlocking said carrier means and said reader/printer to require the use of a specific film carrier in order to operate the reader/printer when it is in the manual insertion mode.

5. A process for displaying either roll film having one or more transparent and photographic areas identified by an individually associated code on said film or discrete film cards in the same reader/printer, without requiring said roll film to be unloaded from said reader/printer when said card is read, said process comprising the steps of:

(a) transporting a roll of film through said reader/printer to selectively display any desired photographic area on said roll of film, (b) selecting the code of any desired one of said transparent or photographic areas, (c) automatically transporting said film to the selected code, (d) automatically reversing the direction in which said film is transported when said codes indicate that said film has been transported beyond the desired code, (e) transporting said film to said transparent area responsive to a predetermined number of reversals in said directions of film transportation without finding the selected code, whereby said film is transported to said transparent area responsive to a demand for either a non-existing code or an unreadable code, (f) inserting a discrete film over said transparent area, and (g) reading said discrete film and through said transparent area on said roll film.

6. The process of claim 5 and the added steps of placing said discrete film card in a film carrier, placing said film carrier into said reader/printer, and interlocking said reader/printer with said film carrier in order to prevent operation responsive to an insertion of a foreign object into said reader/printer.

* * * * *